Nov. 25, 1958  J. I. WARD  2,861,358
FITTED BLOCK TEACHING AIDS
Filed Nov. 3, 1954  2 Sheets-Sheet 1
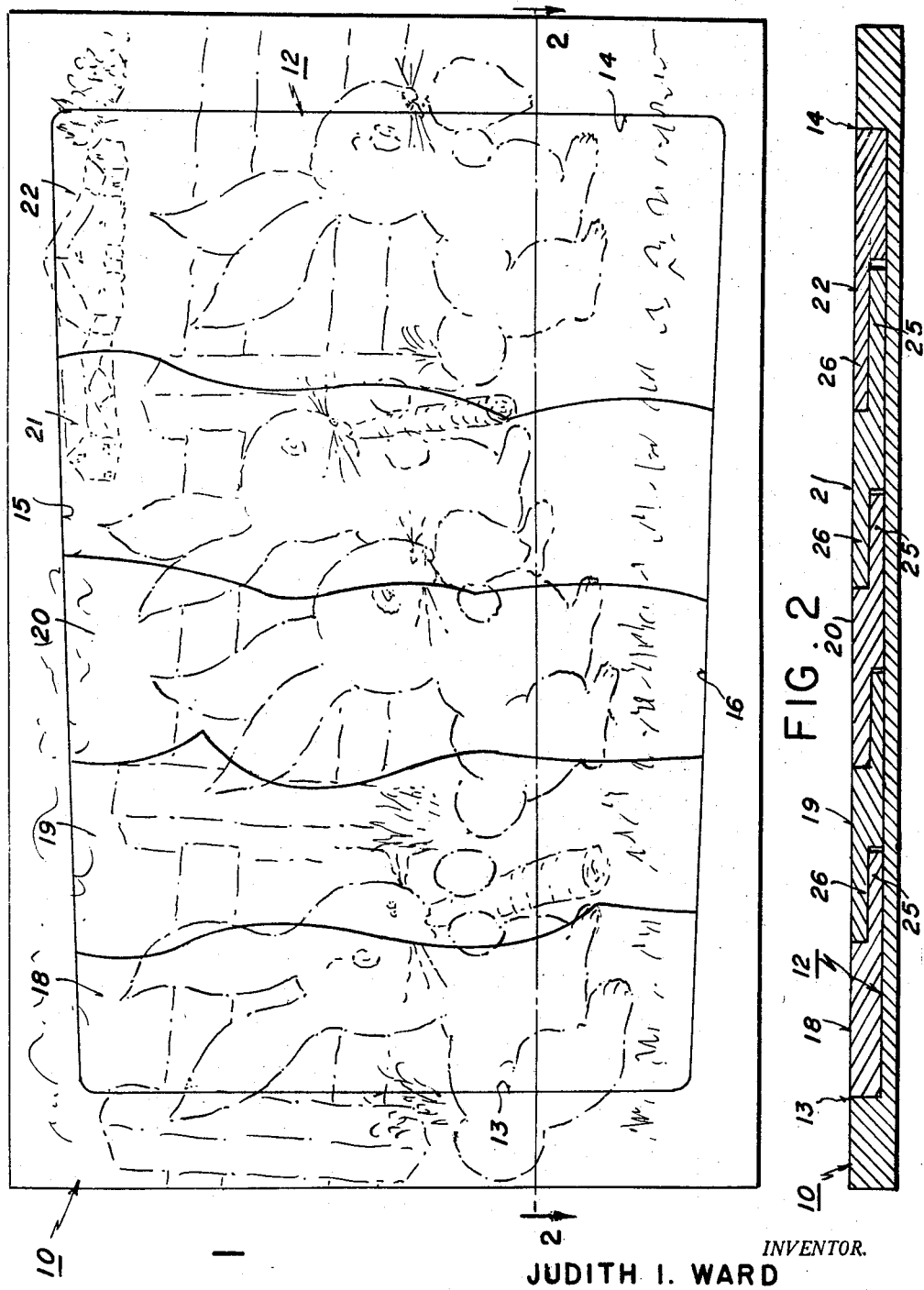
INVENTOR.
JUDITH I. WARD
BY
ATTORNEY

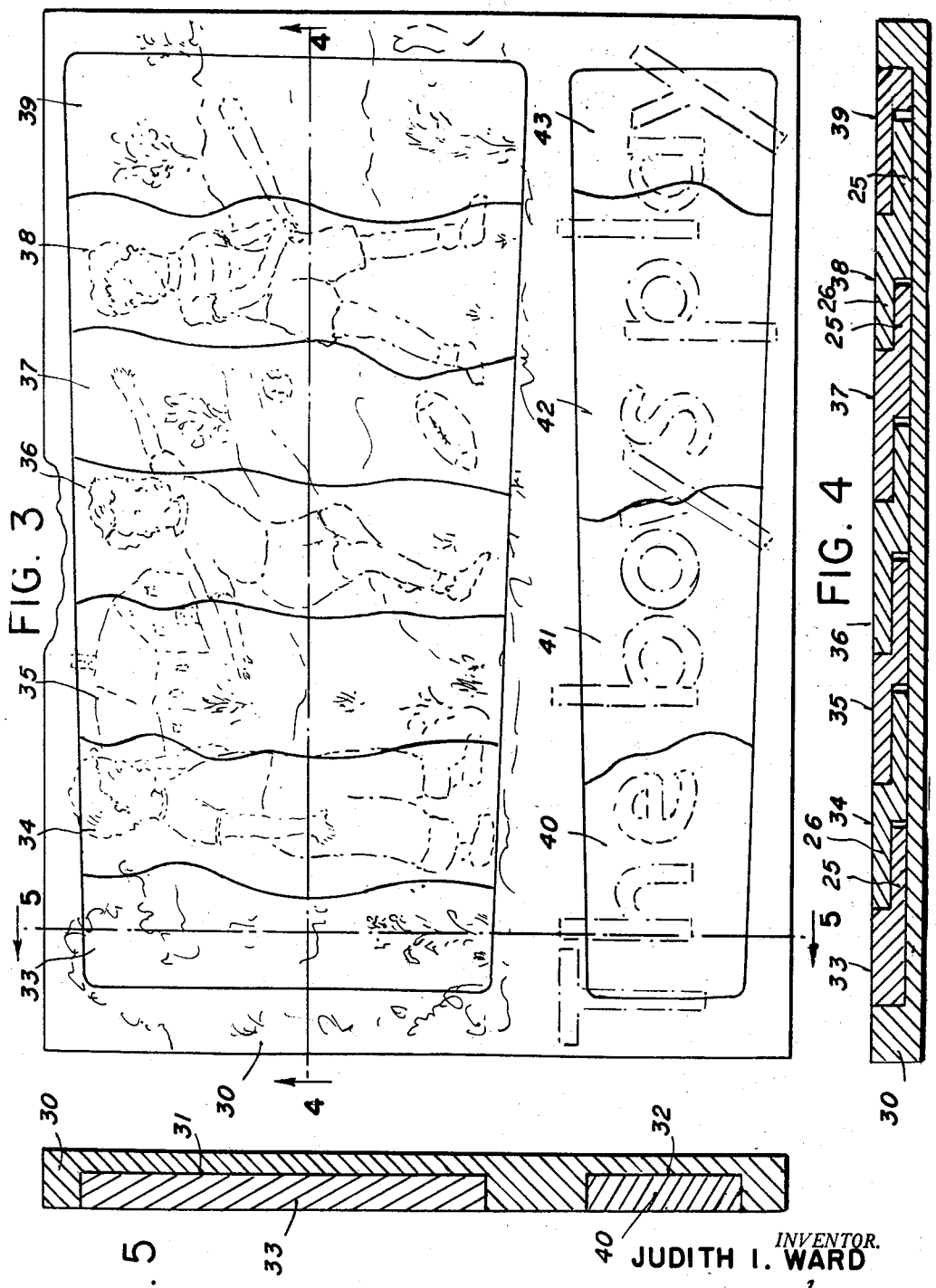

United States Patent Office 2,861,358
Patented Nov. 25, 1958

2,861,358

FITTED BLOCK TEACHING AIDS

Judith I. Ward, Columbus, Ohio

Application November 3, 1954, Serial No. 466,474

5 Claims. (Cl. 35—71)

This invention relates to improvements in teaching aids, and more particularly to an educational jigsaw puzzle for training children in the early stages of reading to read from left to right.

It is well known that many children learning to read exhibit the tendency of reversal; that is to say, they look at and read words and even lines from right-to-left rather than from the accepted left-to-right direction. While there appears to be a difference of opinion among educators as to the cause or causes of this reversal tendency, all generally agree that the remedy therefor is in a method of teaching to read which forces the child into the habit of left-to-right progression, thereby training it subconsciously to look at and read words and lines in the corresponding left-to-right direction.

With the above in mind, a principal object of the present invention is the provision of a teaching aid for use in forcing children in the early stages of being taught to read, i. e. usually children of the kindergarten age, into the habit of left-to-right progression, thereby aiding children having the tendency to read from right-to-left to begin to read in the proper direction.

Another object of the invention is the provision of a teaching aid as aforesaid, in the form of a jigsaw puzzle constructed and arranged so that it can be put together only by assembling the pieces in left-to-right progression.

A further object of the invention is the provision of a training aid for assisting in teaching children in the beginning stages of reading to read in left-to-right direction, which, while having the general form of a jigsaw puzzle, is so constructed and arranged that the pieces making up the same can be matched only by starting from the left and proceeding along a straight line to the right.

A still further object of the invention is the provision of a training aid for children in the beginning stages of reading, which, while useful in training the children of a group, for example, a kindergarten class, in the rudiments of reading from left to right, is especially useful in giving to the individual child exhibiting reversal tendencies remedial exercises which are designed to establish in his or her mind the rule of left-to-right progression in reading words, phrases and/or lines.

Yet another object of the invention is the provision of an effective teaching aid for use in teaching children in the beginning stages of reading to read from left-to-right, which is made up in the form of a jigsaw puzzle combining pictorial and text matter related so as to assist the young children viewing same in recognizing and learning the text matter consequent to its association with the action or some other characteristic of the pictorial matter.

The above and other objects and advantages of the invention will appear from the following detailed description thereof, in which reference is had to the accompanying drawings illustrating two simple forms of a teaching aid according to the invention selected for purpose of simple disclosure, wherein:

Fig. 1 is a plan view of one form of teaching aid of the invention characterized by the use of pictorial matter only;

Fig. 2 is a horizontal section taken along line 2—2 of Fig. 1;

Fig. 3 is a plan view of another form of teaching aid as herein proposed which combines related pictorial and text or word matter;

Fig. 4 is a horizontal section taken along line 4—4 of Fig. 3; and

Fig. 5 is a vertical section taken along line 5—5 of Fig. 3.

In its simplest form, as is illustrated in Figs. 1 and 2, as above, a teaching aid according to the invention comprises a preferably rectangular base member 10 which, as it provides a playing board, will hereinafter, for convenience, be referred to as a "board." Said board is provided with an upper-face shallow recess 12 which has somewhat smaller dimension than the board, whereby it is in effect framed by the unrecessed margin of said board. While the side edges 13, 14 of the recess may extend vertical and parallel with respect to one another and to the associated side edges of the board as well, the top and bottom edges 15, 16 of the recess are non-parallel by a small but nevertheless significant amount. Preferably, this non-parallel relation is effected by slightly sloping the edges 15, 16 away from one another toward the right, so that the recess 12 has least vertical height at its left end and progressively increasing vertical height towards its right end. Other practical ways of providing non-parallelism between the edges 15, 16 may of course be employed.

In the recess 12 are adapted to be assembled a plurality of jigsaw picture puzzle pieces, of which five such pieces, numbered 18–22, are shown. Said pieces illustratively have vertical height corresponding to the vertical height of the recess and complementary irregular adjacent side edges so cut that said pieces can be put together in side-by-side relation to fill said recess and to form a composite whole picture according to a predetermined pattern, as characterizes the usual jigsaw puzzle.

Moreover, according to the present invention, the puzzle pieces 18–22 can be put together or matched only in left-to-right progression; that is to say, by placing the piece 18 at the left end of the recess, by then assembling the piece 19 to the piece 18, by next assembling the piece 20 to the piece 19, and so on. This is made mandatory by the special construction of the puzzle pieces, as follows: First, the piece 18 is cut with non-parallel top and bottom edges which correspond substantially exactly to the non-parallel top and bottom edges 15, 16 of the recess 12 for the length portion thereof taken up by said piece 18; and the same is true for each and every one of the remaining pieces 19–22. Accordingly, the puzzle piece 18, if placed in the right end of the recess 12 would fit so loosely as to be readily apparent, even to a child. Conversely, if the longest puzzle piece 22 were attempted to be placed in the left end of the recess, which it will be recalled has the least vertical height, it will not fit, being too long. Thus it may be said that the vertical height of each puzzle piece demands that it be positioned in a particular location (lateral) of the recess which has a corresponding vertical height. Secondly, as seen in Fig. 2, the adjacent side edges of the puzzle pieces are formed with over-under-lapping construction which is such as to insure that piece 18 be placed in the recess 12 before piece 19 can be assembled therewith; that piece 19 be placed in the recess before piece 20 can be assembled therewith; and so on. This over-under-lapping relation of edges may be simply achieved by stepping back the right hand edge of each puzzle piece (excepting the rightmost piece 22) by an amount as to form along each piece a wide right-edge step 25, and by undercutting the lefthand edge of each puzzle piece (excepting the leftmost piece 18) so as to form along each piece a left-edge overhang 26 which complements the step of the next piece to the left thereof. Preferably, the top faces of the steps may be appropriately colored so as to be clearly distinguishable from the picture or other representation appearing on the main upper surfaces of the pieces.

From the above, it will be clear that a child attempting to solve the puzzle, i. e. assemble the puzzle pieces 18–22 to the board 10, so that they form a complete intelligible picture, must assemble the pieces in a left-to-right progression, since no other kind or order of assembly is practical or even possible. Accordingly, the child completing the puzzle is forced to analyze the pieces and to assemble them from left-to-right and linearly in just the order that he or she is called upon to follow in analyzing letters and in mentally assembling them as a word or words.

Referring to Figs. 3–5, such illustrates a teaching aid employing the same principle as already described, but combining with a picture additional matter in the form of simple words or an expression selected so as to be readily associated by a child with the picture, to the end that he or she will finally come not only to know and to read the words but also to recognize their meaning. This more advanced form of aid employs a board 30 illustratively provided with two recesses 31, 32 each corresponding in all substantial respects with the aforesaid recess 12. In the upper recess 31 is adapted to be assembled the picture puzzle pieces 33–39, inclusive, constructed similarly to the aforesaid puzzle pieces 18–22, and in the lower recess 32 is adapted to be assembled the word puzzle pieces 40–43, inclusive, also constructed similarly to said pieces 18–22. Preferably, the composite picture carried by the puzzle pieces 33–39 is an action picture, illustratively one of boys playing, and the word material carried by the puzzle pieces 40–43 is the sentence "The boys play" which, it will be noted, is directly related to the subject of the picture.

Thus, in addition to a puzzle as aforesaid being useful in training a child or children working with same to acquire the habit of left-to-right progression, it may also be used as an aid in teaching children to know and read words, phrases, sentences, etc. by the association with a picture or the like combined therewith.

It should be understood that the invention has been disclosed in its simple forms and that it may be made up in larger and more complex forms suitable, for example, to match the progress of the child or children being taught, to train the more advanced child, or to give remedial exercises to the child suffering from the more extreme case of reading reversal. While described as a teaching aid, its salient features may of course be incorporated into jigsaw puzzles of the type used by adults for their entertainment.

As many changes could be made in carrying out the above constructions without departing from the scope of the invention, it is intended that all matter contained in the above description or shown in the accompanying drawing shall be interpreted as illustrative and not in a limiting sense.

I claim:

1. In a device of the character described, the combination of a playing board having a shallow recess in its upper face which has substantial width as compared to its height and being defined in part by top and bottom edges which are spaced varying distances apart throughout the width of the recess, a plurality of jigsaw puzzle pieces adapted to be assembled one with the other within said recess, said pieces extending from top to bottom edge of said recess and themselves having top and bottom edges which, when the puzzle pieces are assembled in said recess, are spaced apart varying distances corresponding to the spacing between said top and bottom edges of the recess, and the adjacent side edges of the puzzle pieces being complementally stepped and undercut in manner as to require said pieces to be assembled in a predetermined progression.

2. In a device of the character described, the combination of a rectangular playing board having its major dimension extending horizontally and being provided with an upper-face generally rectangular recess also arranged with its major dimension extending horizontally, the top and bottom edges of the recess being non-parallel by a small but nevertheless significant amount resulting in the left end of the recess having smallest vertical dimension and the recess having increasing vertical dimension towards its right end, a plurality of jigsaw puzzle pieces adapted when assembled to completely fill said recess, said pieces extending top to bottom of said recess and having top and bottom edges which are so spaced vertically that each of the puzzle pieces must be located in its own width portion of the recess, and the adjacent side edges of the puzzle pieces being complementally stepped and undercut in manner as to require said pieces to be assembled in left-to-right progression.

3. A teaching aid for use in teaching children learning to read the rule of left-to-right progression of letters and words comprising, in combination, a supporting and playing board having a recess formed in its upper face, said recess being slightly non-rectangular in outline due to its top and bottom edges having a small inclination to one another and being arranged with its long dimension extending horizontally, a plurality of jigsaw puzzle pieces adapted to be assembled one with the other within said recess, the top surfaces of said pieces carrying portions of a picture which is adapted to be completed only upon proper assembly of the pieces within said recess, said pieces extending top and bottom of the recess and having top and bottom edges which are inclined to one another by the same angle as are the top and bottom edges of said recess, whereby said pieces each must be located in its own width portion of the recess, and the adjacent side edges of the puzzle pieces having complemental offsets as viewed in transverse section which extend in direction as to insure assembly of the pieces in left-to-right progression.

4. A teaching aid as set forth in claim 3, wherein the complemental offsets comprise a step extending along the right edge of the lefthand piece of each pair thereof, and a complemental overhanging extending along the left edge of the right-hand piece of the pair.

5. A teaching aid as set forth in claim 3, wherein the playing board is provided with a second recess spaced a small distance from and which is constructed similarly to said first recess, there being provided a second set of jigsaw puzzle pieces constructed and arranged so as to be assembled in aid second recess similarly to the assembly of said first puzzle pieces in said first recess, at least the top surface of the second set of puzzle pieces carrying printing in the nature of a word, sentence and the like related to the subject of the picture carried by said first puzzle pieces.

References Cited in the file of this patent

UNITED STATES PATENTS

| | | |
|---|---|---|
| 723,435 | Thompson | Mar. 24, 1903 |
| 1,230,263 | Alexander | June 19, 1917 |
| 2,119,921 | Levy | June 7, 1938 |